United States Patent
He

(10) Patent No.: US 11,184,452 B2
(45) Date of Patent: Nov. 23, 2021

(54) SYSTEM AND METHOD FOR SELECTING PROXY COMPUTER

(71) Applicant: Yokogawa Electric Corporation, Musashino (JP)

(72) Inventor: Wei He, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 1077 days.

(21) Appl. No.: 15/783,489

(22) Filed: Oct. 13, 2017

(65) Prior Publication Data

US 2019/0116236 A1   Apr. 18, 2019

(51) Int. Cl.
| | |
|---|---|
| H04L 29/08 | (2006.01) |
| H04L 29/06 | (2006.01) |
| G05B 19/418 | (2006.01) |
| H04L 12/24 | (2006.01) |
| G06N 5/04 | (2006.01) |

(52) U.S. Cl.
CPC .......... *H04L 67/28* (2013.01); *G05B 19/4185* (2013.01); *G06N 5/046* (2013.01); *H04L 41/0896* (2013.01); *H04L 41/16* (2013.01); *H04L 63/20* (2013.01)

(58) Field of Classification Search
CPC ......... H04L 41/16; H04L 67/28; H04L 63/20; H04L 41/0604; G05B 19/4185; G06N 5/00; G06N 5/046
See application file for complete search history.

(56) References Cited

U.S. PATENT DOCUMENTS

| | | | | |
|---|---|---|---|---|
| 2012/0041910 A1* | 2/2012 | Ludik | ................. | G06F 16/2465 706/12 |
| 2015/0006684 A1* | 1/2015 | Chu | .................... | H04L 41/0873 709/220 |
| 2015/0120863 A1* | 4/2015 | Wu | ......................... | H04L 67/28 709/217 |
| 2015/0156069 A1* | 6/2015 | Wu | ......................... | H04L 67/02 709/221 |
| 2015/0358777 A1* | 12/2015 | Gupta | ..................... | H04L 67/18 370/254 |
| 2016/0132048 A1* | 5/2016 | Kambe | ................. | G05B 19/418 700/87 |
| 2017/0155623 A1* | 6/2017 | Smith | .................. | H04L 67/1023 |
| 2018/0227176 A1* | 8/2018 | Ponnuswamy | ......... | H04L 41/16 |
| 2019/0036777 A1* | 1/2019 | Frizzell | .................... | H04L 67/06 |

* cited by examiner

*Primary Examiner* — Miranda M Huang
*Assistant Examiner* — Yao D Huang
(74) *Attorney, Agent, or Firm* — Sheridan Ross P.C.

(57) ABSTRACT

A proxy-selection system includes an expert rule module that stores a respective set of expert rules applicable to each target device, each expert rule having a respective selection-weight factor. The intelligence module includes logic to acquire, from the separator, the categorized device data for each target device; logic to search, from the expert rule module, a respective set of expert rules which are all applicable to each target device; logic to apply the respective set of expert rules searched for each target device; logic to calculate the respective selection-weight factors of all of the respective set of expert rules applied; and logic to select one or more proxy computers based on a result of the calculation of the selection-weight factors.

20 Claims, 3 Drawing Sheets

SYSTEM AND METHOD FOR SELECTING PROXY COMPUTER

TECHNICAL FIELD

Embodiments of the present invention generally relate to a system and a method for selecting proxy computers in an industrial plant network, and more particularly, but not limited to, a facade data acquisition method and system in an integrated control and safety system (ICSS) in an industrial plant.

BACKGROUND ART

In general, an integrated control and safety system (ICSS) in an industrial plant uses a special network and a complex architecture. Efficient data acquisition or direct data acquisition are based on the complex architecture of the integrated control and safety system (ICSS). The architecture complexity of the integrated control and safety system (ICSS) makes it difficult to do efficient data acquisition or direct data acquisition. For example, the architecture complexity makes it difficult for general-purpose computers such as PCs to have direct accesses to all industrial network devices. In some cases, each computer makes an access to field control systems or stations through control buses by identifying and selecting one or more proxy computers as human interface stations or systems in the network. Thus, the special network for the integrated control and safety system (ICSS) uses a plurality of special network devices that need specific configuration data. This means that it is necessary to select such proxy computers as to satisfy conditions including static conditions and dynamic conditions. Examples of the static conditions may be, but are not limited to, the specifications and revisions of each proxy computer. Examples of the dynamic conditions may be, but are not limited to, the current status of each proxy computer. Examples of the current status can be busy or not busy. It is necessary to select each proxy computer on the basis of such complicated conditions including the static conditions and the dynamic conditions. If an improper selection of proxy computer is made to acquire information from plant devices such as field control systems or stations, then data acquisition cannot be performed, while affecting any performance of some types of devices which are critical. An example of the improper selection to proxy computer may be, but is not limited to, a selection to a proxy computer which has already high load, placing the selected proxy computer into overload status.

FIG. 1 is a view of a way of selecting a proxy computer to communicate with a target device to acquire data from the target device in the related art. The term "proxy computer" used herein refers to a computer which acts for a client device as an agent for the client device to communicate with one or more target devices and acquire data or information from the one or more target devices. Referring to FIG. 1, there will be described related art for the purpose of merely providing basic knowledge of the system for selecting a proxy computer to communicate with a target device to acquire data from the target device. For the integrated control and safety system (ICSS), a plant system 10000 includes a system for selecting a proxy computer to communicate with a target device in a plant to acquire data from the target device. The system for selecting a proxy computer includes a proxy selection engine 11000. The plant system 10000 also includes a proxy computer 12000 to be selected by the proxy selection engine 11000, and a target device 13000 to which the proxy computer 12000 have an access and communication for acquisition of data from the target device 13000.

The proxy selection engine 11000 can be implemented by one or more hardware components such as hardware processors and one or software components such as computer-executable programs and/or logics. The proxy selection engine 11000 is configured to receive, from a client, input of target device information for identifying a target device 13000. The target device 13000 may be, but is not limited to, a device in the integrated control and safety system (ICSS). Examples of the target device 13000 may include, but are not limited to, field control stations or systems (FCS) or safety control stations or systems (SCS). The proxy selection engine 11000 is configured to refer to certain rules which have previously been set for the purpose of deciding which proxy computer the proxy selection engine 11000 should better select. The set of expert rules may typically include static and dynamic conditions for each proxy computer. Examples of the static conditions may be, but are not limited to, the specifications and revisions of each proxy computer. Examples of the dynamic conditions may be, but are not limited to, the current status of each proxy computer. Examples of the current status can be busy or not busy. The proxy selection engine 11000 is configured to select, based on the set of expert rules as referred, a proxy computer 12000 for each target device which is identified by the target device information that the proxy selection engine 11000 received from the client. The proxy computer 12000, which is selected by the proxy selection engine 11000, communicates with the target device 13000 that is identified by the target device information. The proxy computer 12000 acquires data from the target device 13000 and output the acquired data for the client.

In accordance with the current practices, a highly skilled engineer must be called to use the proxy selection engine 11000 as a selection tool to select a proper proxy computer. The proxy selection engine 11000 does not automatically select a proper target device 13000 that can acquire latest data which is currently applied to the target device 13000, based on complicated conditions including static conditions such as system/project design, workload, and work schedule and dynamic conditions such as current status of the target device 13000. The highly skilled and time-consuming procedures are necessary to he performed by the engineers to select a proper proxy computer, based on complicated conditions including static conditions such as system/project design, workload, and work schedule and dynamic conditions such as current status of the target device 13000. For example, the highly skilled engineer must manually check the static conditions such as system/project design, workload, and work schedule, as well as manually check the dynamic conditions including not only the current status of the proxy computer 12000 but also the whole system running status in real-time. The proxy selection engine 11000 is configured to establish certain rules for assisting proxy selection and present the establish set of expert rules and allow an engineer to change or modify the set of expert rules. The proxy selection engine 11000 does not automatically select a proper proxy computer which is able to get all necessary data which are synchronized with the currently applied data. Rather, the proxy selection engine 11000 still actually needs highly skilled and time-consuming procedure by such a highly skilled engineer to select a proper proxy computer, based on complicated conditions including static conditions such as system/project design, workload, and work schedule and dynamic conditions such as current status of the target device 13000.

SUMMARY

In some aspects, a computer-implemented proxy-selection system may include, but is not limited to, an expert rule module, a separator module, and an intelligence module. The expert rule module may further include, but is not limited to, a storage that stores a respective set of expert rules applicable to each target device, each expert rule having a respective selection-weight factor. The separator module is configured to categorize acquired device data of each target device on the basis of: at least in part system and type of each target device. Examples of the target devices may include, but are not limited to, field control stations or systems (FCS) or safety control stations or systems (SCS). The intelligence module accessible to the separator module, the intelligence module may include, but is not limited to: logic to acquire, from the separator, the categorized device data for each target device; logic to search, from the expert rule module, a respective set of expert rules which are all applicable to each target device; logic to apply the respective set of expert rules searched for each target device; logic to calculate the respective selection-weight factors of all of the respective set of expert rules applied; and logic to select one or more proxy computers based on a result of the calculation of the selection-weight factors.

EMBODIMENTS

Figure 1:
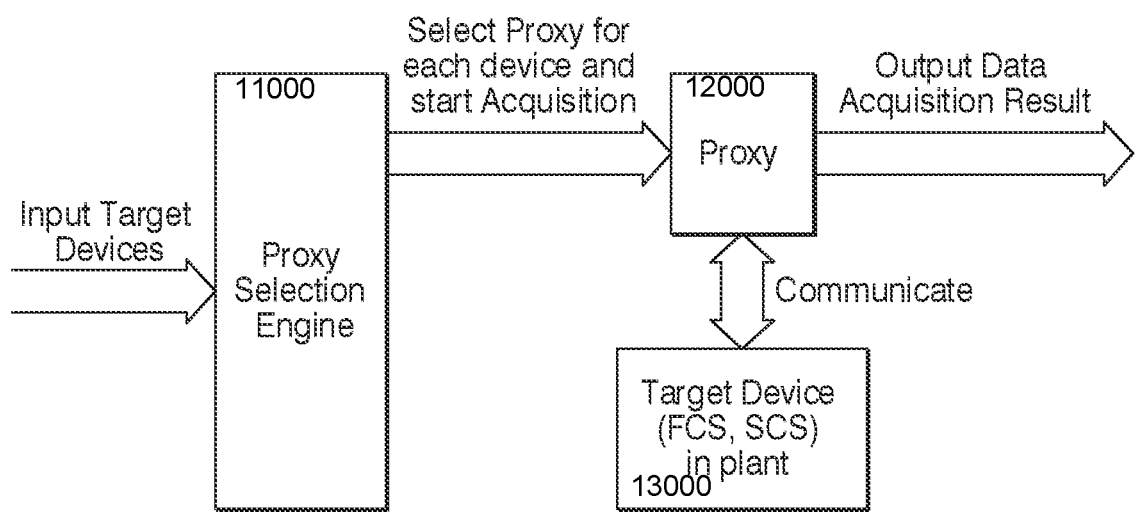
FIG. 1 is a view of a way of selecting a proxy computer to communicate with a target device to acquire data from the target device in the related art.

In some aspects, a computer-implemented proxy-selection system may include, but is not limited to, an expert rule module, a separator module, and an intelligence module. The expert rule module may further include, but is not limited to, a storage that stores a respective set of expert rules applicable to each target device, each expert rule having a respective selection-weight factor. The separator module is configured to categorize acquired device data of each target device on the basis of: at least in part system and type of each target device. The intelligence module accessible to the separator module, the intelligence module may include, but is not limited to: logic to acquire, from the separator, the categorized device data for each target device; logic to search, from the expert rule module, a respective set of expert rules which are all applicable to each target device; logic to apply the respective set of expert rules searched for each target device; logic to calculate the respective selection-weight factors of all of the respective set of expert rules applied; and logic to select one or more proxy computers based on a result of the calculation of the selection-weight factors.

In some cases, the respective set of expert rules applicable to each target device includes: static and dynamic conditions for each proxy computer. The static conditions include specifications and revisions of each proxy computer. The dynamic conditions include current status of each proxy computer.

In some cases, the expert rule is related to a version of each proxy computer. The set of algorithms is related to not to select the proxy computer if the version of the proxy computer is lower than a version of the target device, based on the calculated selection-weight factor.

In some cases, the expert rule is related to select a station or system type of each proxy computer. The set of algorithms is related to select a certain station or system type of the proxy computer for a target device, based on the calculated selection-weight factor.

In some cases, the expert rule is related to a license installed in each proxy computer. The set of algorithms is related to select license installed and/or a certain license installed in the proxy computer for the target device, based on the calculated selection-weight factor.

In some cases, the dynamic conditions include network load, current status of each proxy computer, and real-time status of the target devices.

In some cases, the intelligence module further includes: logic to automatically acquire the expert rules from the expert rule module; logic to automatically confirm, based on the static conditions of all the expert rules applicable to each target device; logic to automatically determine which proxy computers satisfy the static conditions of the expert rules applicable to each target device, based on the static conditions of the expert rules applicable to each target device; logic to automatically confirm, based on the dynamic conditions of the expert rules, the current status of the proper proxy computers that are determined to satisfy the static conditions of the expert rules; logic to automatically determine which proxy computers satisfy the dynamic conditions of the expert rules, based on the dynamic conditions of the expert rules; and logic to automatically determine one or more proxy computers that satisfy both the static and dynamic conditions of the expert rules.

In some cases, the intelligence module further includes: a set of expert rules which are applicable to each target device; and a set of algorithms to select one or more proxy computers by applying the set of expert rules.

In some cases, the set of algorithms includes: logic to calculate a selection-weight factor for each proxy computer; and logic to select a proxy based on the selection-weight factor calculated.

In some cases, a system may include, but is not limited to, a plurality of proxy computers on a network; an editor configured to enter target device information which identifies a target device; a proxy-selection system; and an implementation data acquisition (IDA). The proxy-selection system may include, but is not limited to, an expert rule module; a separator module; and an intelligence module. The expert rule module includes a storage that stores a respective set of expert rules applicable to each target device, each expert rule having a respective selection-weight factor. The separator module is configured to receive the target device information which identifies the target device. The separator module is configured to categorize the target device on the basis of: at least in part system and type of the target device. The intelligence module is accessible to the separator module. The intelligence module may include, but is not limited to, logic to acquire, from the separator, the categorized device data for each target device; logic to search, from the expert rule module, a respective set of expert rules which are all applicable to each target device; logic to apply the respective set of expert rules searched for each target device; logic to calculate the respective selection-weight factors of all of the respective set of expert rules applied; and logic to select one or more proxy computers based on a result of the calculation of the selection-weight factors. The implementation data acquisition (IDA) is configured to send, via the proxy computer selected by the proxy-selection system to the target device identified by the target device information, one or more queries for more detailed information of configurations of the implemented target device in the plant and to acquire the more detailed information of implementation from the target device via the one or more proxy computers selected by the proxy-selection system. The detailed information of each configuration item comprises, but is not limited to: a configuration item category; a configuration item type belonging to the configuration item category; a configuration item name; and a configuration item full path.

In some cases, the respective set of expert rules applicable to each target device includes: static and dynamic conditions for each proxy computer. The static conditions include specifications and revisions of each proxy computer. The dynamic conditions include current status of each proxy computer.

In other aspects, the expert rule is related to a version of each proxy computer. The set of algorithms is related to not to select the proxy computer if the version of the proxy computer is lower than a version of the target device based on the calculated selection-weight factor.

In some cases, the dynamic conditions comprise network load, current status of each proxy computer, and real-time status of the target devices.

In some cases, the intelligence module further include: logic to automatically acquire the expert rules from the expert rule module; logic to automatically confirm, based on the static conditions of all the expert rules applicable to each target device; logic to automatically determine which proxy computers satisfy the static conditions of the expert rules applicable to each target device, based on the static conditions of the expert rules applicable to each target device; logic to automatically confirm, based on the dynamic conditions of the expert rules, the current status of the proper proxy computers that are determined to satisfy the static conditions of the expert rules; logic to automatically determine which proxy computers satisfy the dynamic conditions of the expert rules, based on the dynamic conditions of the expert rules; and logic to automatically determine one or more proxy computers that satisfy both the static and dynamic conditions of the expert rules.

In some cases, the intelligence module further include: a set of expert rules which are applicable to each target device; and a set of algorithms to select one or more proxy computers by applying the set of expert rules.

In some cases, the set of algorithms includes logic to calculate a selection-weight factor for each proxy computer; and logic to select a proxy based on the selection-weight factor calculated.

In still other aspects, a computer-implemented proxy-selection system may include, but is not limited to: an intelligence module. The intelligence module may include, but is not limited to, logic to search a respective set of expert rules which are all applicable to each target device, wherein the respective set of expert rules comprises static and dynamic conditions for each proxy computer, the static conditions comprise specifications and revisions of each proxy computer and the dynamic conditions comprise network load, current status of each proxy computer, and real-time status of the target devices; logic to apply the respective set of expert rules searched for each target device; logic to calculate the respective selection-weight factors of all of the respective set of expert rules applied; and logic to select one or more proxy computers based on a result of the calculation of the selection-weight factors.

In some cases, the expert rule is related to a version of each proxy computer, and the set of algorithms is not select the proxy computer if the version of the proxy computer is lower than a version of the target device, In some cases, the expert rule is related to select a station or system type of each proxy computer, and the set of algorithms is related to select a certain station or system type of the proxy computer for a target device.

In some cases, the expert rule is related to a license installed in each proxy computer, and the set of algorithms is related to select license installed and/or a certain license installed in the proxy computer for the target device.

In some cases, the configuration item editor included in configuration item management is further configured to receive the acquisition results from the proxy computer wherein the acquisition results comprise the detailed information of implementation from the target device in a plant.

[Illustrative Examples]

Figure 2:
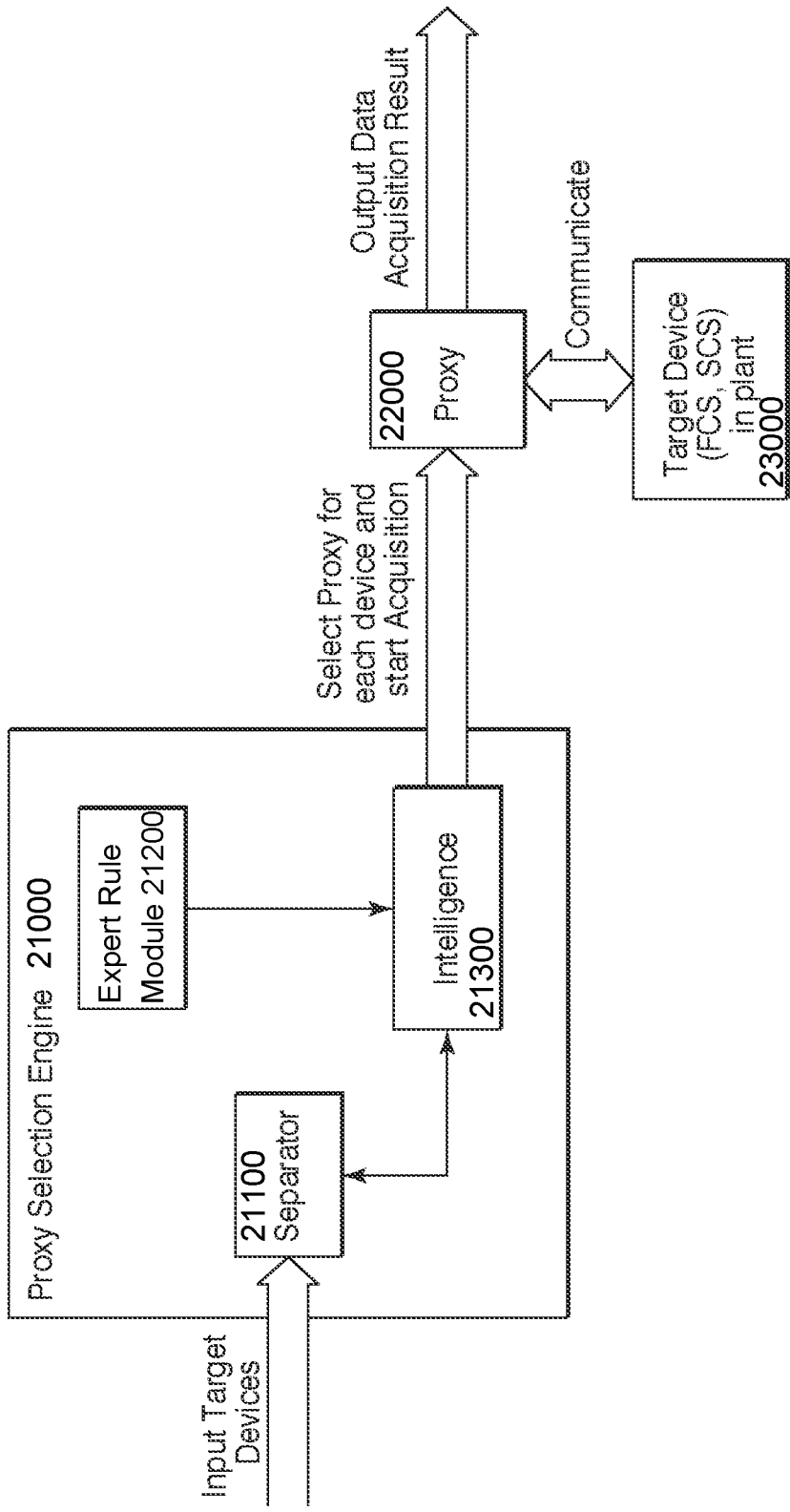
FIG. 2 is a view of a system for selecting a proxy computer to communicate with a target device to acquire data from the target device in embodiments.

Whereas the above-described embodiments are a full of descriptions, for further facilitation to understand the above-described embodiments, some illustrative examples will be given with reference to the drawings. FIG. 2 is a view of a system for selecting a proxy computer to communicate with a target device to acquire data from the target device in embodiments. With reference to FIG. 2, a plant system 20000 includes a proxy selection engine 21000 configured to automatically select, based on static and dynamic statuses of each proxy computer in a plant, a proper proxy computer 22000 so as to allow the selected proxy computer 22000 to automatically communicate with a target device 23000 and the selected proxy computer 22000 to automatically acquire device data from the target device 23000. Examples of the static statuses of the proxy computer 22000 may be, but are not limited to, the specifications and revisions of each proxy computer. Examples of the dynamic statuses of the proxy computer 22000 may be, but are not limited to, the real-time statuses of each proxy computer. The proxy selection engine 21000 is configured to allow automatic registration and automatic acquisition of device data from the target device 23000, based on the static and dynamic statuses of the proxy computer 22000. The automatic registration and automatic acquisition of device data from the target device 23000 does not need any highly skilled and time-consuming procedure from the engineers to select the proper proxy computer 22000 and acquire the data from the target device 23000. For example, the proxy selection engine 21000 does not need any more manual check by an engineer on the static conditions such as system/project design, workload, and work schedule, as well as any more manual check on the dynamic conditions including not only the current status of the proxy computer 22000 but also the whole system running status in real-time. Examples of the current status can be busy or not busy. The proxy selection engine 21000 is configured to automatically select the proper proxy computer 22000 which is able to get all necessary data which are synchronized with the data which is currently applied to the target device 23000. The proxy selection engine 21000 is configured to support any engineer without high skills and experiences to get all necessary data which are synchronized with the data which are currently applied to the target device 23000. The proxy selection engine 21000 is configured to prevent the proxy computer 22000 from getting any unexpected results of data acquisition from the target device 23000. The proxy selection engine 21000 is configured to perform efficient data acquisition without affecting any critical device. The proxy selection engine 21000 is configured to reduce the costs for an engineer to make and manage device data.

The proxy selection engine 21000 may include, but is not limited to, a separator 21100, an expert rule module 21200 including a storage that stores a respective set of expert rules for each target device 23000, and an intelligence 21300. The separator 21100 and the intelligence 21300 can be implemented by one or more hardware components such as hardware processors and one or software components such as computer-executable programs and/or logics. The expert rule module 21200 can be implemented by a storage that stores at least a set of expert rules. In some cases, the at least set of expert rules have previously been set for the purpose of selecting which proxy computer the proxy selection engine 21000 should better select. The set of expert rules may typically include static and dynamic conditions for each proxy computer. Examples of the static conditions may be, but are not limited to, the specifications and properties as well as revisions of each proxy computer. Examples of the dynamic conditions may be, but are not limited to, the current status of each proxy computer 22000.

The separator 21100 is configured to receive input of device data of each target device and to categorize each target device in terms of a system to which each target device belongs and a type of each target device. In order to do the data acquisition in highly efficient way, the system 20000 needs to select a proxy that is proper or adequate not only for the target device only but also optimized for whole data acquisition procedure. The separator 21100 is configured to pass each categorized target device to the intelligence 21300.

The expert rule module 21200 stores the expert rules. The expert rules are a set of logic knowledges and fact knowledges from experts on the selection of one or more proxy computers 22000. The expert rules may include, but not limited to, both the static conditions and the dynamic conditions. Examples of the static conditions may be, but are not limited to, the specifications and revisions of each proxy computer 22000. Examples of the dynamic conditions may be, but are not limited to, the current status of each proxy computer 22000. The expert rule module 21200 can be implemented by a database and its variables. The expert rule module 21200 is configured to allow the intelligence 21300 to have an access to the expert rule module 21200. The expert rules are available to the intelligence 21300 to search and find selection-candidates of proxy computers 22000 which satisfy the static conditions and the dynamic conditions of the expert rules. In other words, the expert rules provide the static conditions and the dynamic conditions for determining which proxy computer 22000 is proper or adequate not only for the target device only but also optimized for whole data acquisition procedure.

The intelligence 21300 is accessible to the separator 21100. The intelligence 21300 is configured to acquire the device data of each categorized target device from the separator 21100. The intelligence 21300 is configured to automatically confirm, based on the device data of each categorized target device, the specifications of all of target devices from which acquisition of information regarding the target device is necessary.

The intelligence 21300 is accessible to the expert rule module 21200. The intelligence 21300 is configured to automatically search, for each target device, the expert rule module 21200 for all expert rules applicable to each target device, and automatically acquire the expert rules from the expert rule module 21200. The intelligence 21300 is also configured to automatically confirm, based on the static conditions of all the expert rules applicable to each target device 23000, the specifications of proxy computers 22000. The intelligence 21300 is also configured to automatically determine which proxy computers 22000 satisfy the static conditions of the expert rules applicable to the target device 23000, based on the static conditions of the expert rules applicable to the target device 23000. In other words, the intelligence 21300 is also configured to automatically determine one or more statically proper proxy computers 22000 that satisfy the static conditions of the expert rules. The intelligence 21300 is also configured to automatically confirm, based on the dynamic conditions of the expert rules, the current status of all proxy computers 22000 or the current status of only the one or more statically proper proxy computers 22000 that are determined to satisfy the static conditions of the expert rules. Examples of the current status can be busy or not busy. The intelligence 21300 is also configured to automatically determine which proxy computers 22000 satisfy the dynamic conditions of the expert rules, based on the dynamic conditions of the expert rules. The intelligence 21300 is also configured to automatically determine one or more proxy computers 22000 that satisfy both the static and dynamic conditions of the expert rules, and automatically select as selection-candidates the one or more proxy computers 22000 that satisfy both the static and dynamic conditions of the expert rules. The intelligence 21300 is also configured to automatically present or display, via a user interface to user, the selection-candidates of the proper proxy computers 22000 that satisfy both the static and dynamic conditions of the expert rules to allow the intelligence 21300 to make a final decision or selection of one or more proper proxy computers 22000 among the selection-candidates of the proper proxy computers 22000, so as to allow the one or more finally selected proxy computers 22000 to communicate with the target device 23000 and acquire all necessary information from the target device 23000.

Regarding how the intelligence 21300 decides or select the proper proxy computer, the intelligence 21300 uses the two factors: the set of expert rules and the set of algorithms. Regarding the expert rule, the intelligence 21300 will search the expert rules suitable for each target device and to be applied to each target device. For example, the expert rules may be related to the version of the proxy computer. In this case, the proxy computer, which has a lower version than that of the target device, cannot be used as a proxy. The intelligence 21300 has the set of algorithms stored in the intelligence 21300. The set of algorithms is extensible. For example, the intelligence 21300 decides to start which target device data acquisition first, depending upon the network load, real-time status of the proxy computers, and real-time status of the target devices, wherein the network load, real-time status of the proxy computers, and real-time status of the target devices can be acquired by using an application programming interface (API) as a set of subroutine definitions, protocols, and tools for building application software for communication between various software components. If the proxy computers suitable for two different target devices are the same, the algorithms can decide to change one proxy computer for one target device or run the data acquisition processes sequentially, first for the first one and then for the second one.

The set of algorithms is extensible. In another example, users could modify or change the expert rules based on various user requirements or situations, for instance, users could modify or change the expert rule and to avoid including some stations or systems in certain areas/locations as proxy PC.

In more details, the intelligence 21300 is configured to collect all necessary knowledge base information regarding static and dynamic data or conditions of the expert rules to select the selection-candidates of the proper proxy computers 22000 that satisfy the static and dynamic conditions of the expert rules. The intelligence 21300 is configured to acquire the static and dynamic conditions of the expert rules as the collected knowledge base information from the expert rule module 21200. The intelligence 21300 is configured to collect all system information which may include, but are not limited to, system structure information, and inter-relations to other systems, depending upon the categorized data acquisition target devices 23000. The intelligence 21300 is configured to collect physical information which include, but are not limited to, network arrangements. The intelligence 21300 is configured to collect the features of each proxy computer 22000 and current or real-time status of each proxy computer 22000. Examples of the features of each proxy computer 22000 may include, but are not limited to, versions of the proxy computer 22000. Examples of the current or real-time status of each proxy computer 22000 may include, but are not limited to, a status of busy and a status of non-busy the proxy computer 22000. The intelligence 21300 is configured to search for a rule that matches the patterns of data based on all the above static and dynamic information collected. The intelligence 21300 is configured to find or determine one or more proxy computers 22000 to be used for each target device 23000. The intelligence 21300 is configured to check current or real-time loads of the network. For all of the data acquisition target devices, the intelligence 21300 is configured to find or determine a respective one or more candidate of proxy computers 22000 to be used for each target device 23000. The intelligence 21300 is configured to use or refer the collected knowledge base information to make a final decision on the one or more proxy computers selected. The intelligence 21300 is configured to take into account the efficiency of whole data acquisition procedure and minimization of impacts on critical devices.

As modifications, the intelligence 21300 may be implemented by two separate modules, an intelligence module and a selector module. The intelligence 21300 is to acquire all information necessary to make the final decision as described above. The selector module may be added. The selector module is used for checking the real-time network load, for considering all data acquisition target devices, for using the internally stored logic knowledges to make the final decision or selection to one or more proxy computers. The selector module is configured to select finally the one or more proxy computers by considering the efficiency of whole data acquisition procedure and by minimizing the impact to critical devices.

Regarding the data collection and the expert rules, the intelligence 21300 is configured to collect data from all available proxy computers. Examples of data that the intelligence 21300 collects may include, but are not limited to, REFINF version in available proxy computers. The intelligence 21300 is configured to apply the expert to select a better or proper proxy computer in terms of performance. In some cases, it is not better to select always a proxy computer of higher version REFINF. Rather, it is better to select a proxy computer of same version REFINF as a project version of the system. In some cases, the intelligence 21300 is configured to select the proxy computer of same version REFINF as the project version of the system. The intelligence 21300 is configured to apply the expert rule and list down all available proxy computers from the best proxy computer to the worst proxy computer in terms of the applied expert rule or rules.

Regarding the acquisition of the expert rules as the collected knowledge base information, the intelligence 21300 is configured to access to the expert rule module 21200 and pull the expert rules from the expert rule module 21200. For example, for a certain device type, the intelligence 21300 checks the device version number which is downloaded to the target device based on design data for configuration to the target device. The intelligence 21300 pulls the version rule based on the target device type and applies the expert rule to give some intermediate result.

Typical examples of the input of device data of each target device to be subject to the categorization by the separator 21100 may include, but are not limited to, a lot of properties such as "Device Type", "Device Project Type", "Subnet" belongs. The intelligence 21300 searches in the expert rule module 21200 if the property can satisfy the expert rules "Target Property" and "Condition".

Regarding how the intelligence 21300 analyzes and uses the collected static and dynamic conditions of the expert rules for proxy selection, the intelligence 21300 uses different methods, depending on what to collect, for example, collect the version of a target device by searching project database for the version of the target device. The intelligence 21300 collects the version of each proxy computer. If a computer can work as a proxy, a communication module has already installed to communicate with both the proxy selection engine computer and the target device. Thus, the intelligence 21300 just sends communication request to get the version of each proxy computer.

Regarding how many expert rules the intelligence 21300 applies, the intelligence 21300 does not apply a single expert rule because if the intelligence 21300 applied a single expert rule among a plurality of expert rules related to each target devices, then the intelligence 21300 can probably determine or select an improper or unsuitable proxy computer. The intelligence 21300 is configured to apply all of the plurality of expert rules related to each target devices. Each expert rule will gives a list of different proxy computers. Further, each expert rule may be given a respective selection-weight factor for making a decision or selection to a proxy computer. The intelligence 21300 is configured to make, instead of user, a final decision or selection to one or more proxy computers 22000 from the selection-candidates of the proxy computers, so as to allow the one or more finally selected proxy computer 22000 to communicate with the target device 23000 and acquire all necessary information from the target device 23000. The decision making processes made by the intelligence 21300 depend upon a set of algorithms to make the decision. In other words, the intelligence 21300 is configured to make, instead of user, the final decision or selection to one or more proxy computers 22000 from the selection-candidates of the proxy computers in accordance with the set of algorithms to make the decision.

The configuration item editor 34000 included in configuration item management 36000 is further configured to receive the acquisition results from the proxy computer selected, wherein the acquisition results comprise the detailed information of implementation from the target device.

In summary, the intelligence 21300 is configured to collect the data and apply the expert rule and use the algorithms to make the final decision or selection to the one or more proxy computers 22000.

Typical examples of the fact knowledge as the expert rule may be, but are not limited to, the following version rules stored in the expert rule module 21200:

| Rule Index | Target Property A | Condition | Proxy Condition A | Proxy Condition Property B | Condition B | Condition Property C | Condition C | Selection-weight factor |
|---|---|---|---|---|---|---|---|---|
| 1 | Type | Type="BCV" | HIS | System Project | System Project = Target Project | Version | (Version-Target Version)>=0 | 2 |

Some examples of the set of algorithms to make the final decision or selection to one or more proxy computers 22000 may be algorithms to calculate which is the best, after all rules applied, based on each result and each rule selection-weight factor.

For example: For Device 1

After Rule 1: HIS1263; HIS1264; HIS1262; (selection-weight factor:5)

After Rule 2: HIS1264; HIS1263; (selection-weight factor:1)

After Rule 3: HIS1264; HIS1262; HIS1263; (selection-weight factor:1)

Result: HIS1263

The proxy selection engine 21000 is configured to allow the intelligence 21300 to make a final decision or selection of one or more proper proxy computers 22000 among the selection-candidates of the proper proxy computers 22000, so as to allow the finally selected proxy computer 22000 to communicate with the target device 23000 and acquire all necessary information from the target device 23000. In other words, the proxy selection engine 21000 is configured to prohibit user from selecting via user interface any proxy computer which does not satisfy at least a part of the static and dynamic conditions of the expert rules.

The proxy selection engine 21000 as described with reference to FIG. 2 can be applicable for assisting an implementation data acquisition of the configuration item management to acquire detailed configuration item information of the implementation via the proxy computer from the target devices. The detailed information of each configuration item comprises, but is not limited to: a configuration item category; a configuration item type belonging to the configuration item category; a configuration item name; and a configuration item full path.

[Application of Proxy Selection Engine for Configuration Item Management]

Figure 3:
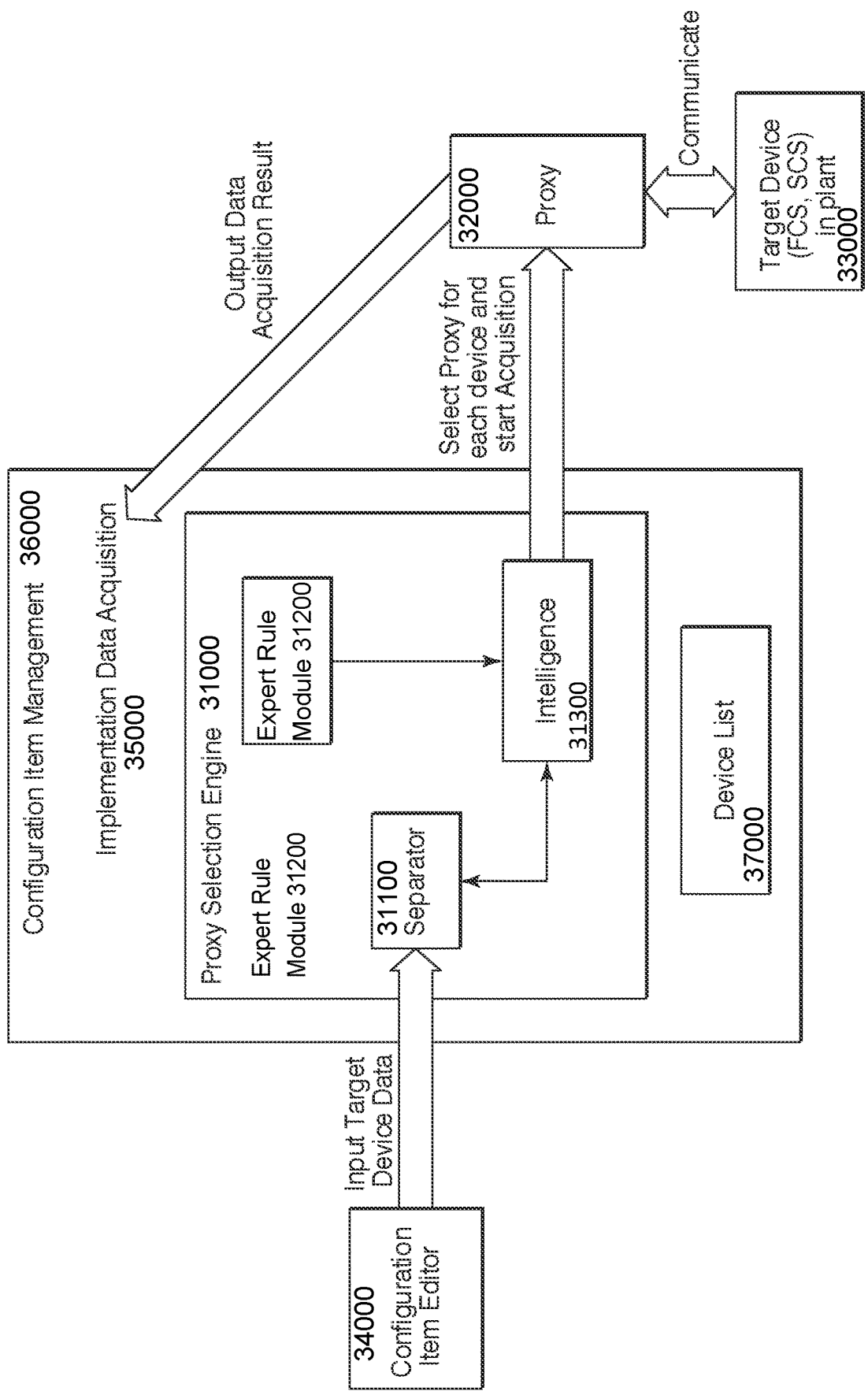
FIG. 3 is a view of a configuration item management system for selecting a proxy computer to communicate with a target device to acquire data from the target device in other embodiments.

FIG. 3 is a view of a configuration item management system 30000 for selecting a proxy computer to communicate with a target device to acquire data from the target device in other embodiments. With reference to FIG. 3, a proxy selection engine 31000 can be applicable to a configuration item management system 30000 for acquiring and analyzing design data from a target device 33000 in a plant via a proxy computer 32000. The system 30000 includes an engineering tool. The engineering tool may include, but is not limited to, an automation design organizer, a system view, and a work bench. The automation design organizer may include, but is not limited to, a configuration item management 36000. The configuration item management 36000 may include, but is not limited to, a design data acquisition (DDA), an implementation data acquisition (IDA) 35000, and a network device detection (NDD). The design data acquisition (DDA) may further include, but is not limited to, a master design data analyzer. The master design data analyzer is configured to analyze plant configuration information included in the design data in the master status of the master status latest version acquired by the design data acquisition, independently of changing design data in the plant-downloading design data via the engineering tool. The configuration item management 36000 is accessible to a design data version management in an automation design system. The design data acquisition (DDA) is configured to acquire design data in the master status of the master status latest version from the design data version management independently of changing the plant-downloading design data via the engineering tool. The implementation data acquisition (IDA) 35000 is configured to send the field control system one or more queries for more detailed information of configuration items of the implemented field control system and to acquire the more detailed information of implementation from the field control system. The network device detection (NDD) is configured to be accessible to a plurality of network devices connected to the field control system. The network device detection (NDD) is configured to acquire, for configuration items, configuration status of the plurality of network devices.

The proxy selection engine 31000 can be usable to select the proxy computer 32000 to communicate with the target device 33000 to have the implementation data acquisition (IDA) 35000 send via the selected proxy computer 32000 to the target device 33000 one or more queries for more detailed information of configuration items of the implemented target device and to acquire the more detailed information of implementation from the target device 33000 via the proxy computer 32000.

The configuration item management 36000 has a configuration item editor 34000 that is configured to enter into the proxy selection engine 31000 input of target device information for identifying a target device 33000. The target device 33000 may be, but is not limited to, a device in the integrated control and safety system (ICSS). The separator 31100 and the intelligence 31300 can be implemented by one or more hardware components such as hardware processors and one or software components such as computer-executable programs and/or logics. The expert rule module 31200 can be implemented by a storage that stores at least a set of expert rules. In some cases, the at least set of expert rules have previously been set for the purpose of selecting which proxy computer the proxy selection engine 31000 should better select. The set of expert rules may typically include static and dynamic conditions for each proxy computer. Examples of the static conditions may be, but are not limited to, the specifications and properties as well as revisions of each proxy computer. Examples of the dynamic conditions may be, but are not limited to, the current status of each proxy computer 32000.

The separator 31100 is configured to receive, from the configuration item editor 34000, input of device data of each target device and to categorize each target device in terms of a system to which each target device belongs and a type of each target device. In order to do the data acquisition in highly efficient way, the system 30000 needs to select a proxy that is proper or adequate not only for the target device only but also optimized for whole data acquisition procedure. The separator 31100 is configured to pass each categorized target device to the intelligence 31300.

The expert rule module 31200 stores the expert rules, a set of logic knowledge and fact knowledge from experts on the selection of one or more proxy computers 32000. The expert rules may include, but not limited to, both the static conditions and the dynamic conditions. Examples of the static conditions may be, but are not limited to, the specifications and revisions of each proxy computer 32000. Examples of the dynamic conditions may be, but are not limited to, the current status of each proxy computer 32000.

The intelligence 31300 is accessible to the separator 31100. The intelligence 31300 is configured to acquire the device data of each categorized target device from the separator 31100. The intelligence 31300 is configured to automatically confirm, based on the device data of each categorized target device, the specifications of all of target devices from which acquisition of information regarding the target device is necessary.

The intelligence 31300 is configured to automatically search, for each target device, the expert rule module 31200 for all expert rules applicable to each target device, and automatically acquire the expert rules from the expert rule module 31200. The intelligence 31300 is also configured to automatically confirm, based on the static conditions of all the expert rules applicable to each target device 33000, the specifications of proxy computers 32000. The intelligence 31300 is configured to apply the expert rule and list down all available proxy computers in a form of device list 37000 from the best proxy computer to the worst proxy computer in terms of the applied expert rule or rules. The intelligence 31300 is also configured to automatically determine which proxy computers 32000 satisfy the static conditions of the expert rules applicable to the target device 33000, based on the static conditions of the expert rules applicable to the target device 33000.

The implementation data acquisition (IDA) 35000 sends via the proxy computer 32000 selected by the intelligence 31300 to the target device 33000 one or more queries for more detailed information of configuration items of the implemented target device and to acquire the more detailed information of implementation from the target device 33000 via the proxy computer 32000.

Each element or device for the system or apparatus described above can be implemented by hardware with or without software. In some cases, the system or apparatus may be implemented by one or more hardware processors and one or more software components wherein the one or more software components are to be executed by the one or more hardware processors to implement each element or device for the system or apparatus. In some other cases, the system or apparatus may be implemented by a system of circuits or circuitry configured to perform each operation of each element or device for the system or apparatus.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The above described snapshot search system or apparatus described above can be implemented by in part or entirely artificial intelligence. The artificial intelligence snapshot search system can include snapshot search technology, fuzzy logic and neural networks that enable user to automatically conduct snapshot search over a. plurality of field devices in a plant.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer-implemented proxy-selection engine communicatively coupled through a network to a plurality of proxy computers, which are communicatively coupled to a plurality of target devices through a special control network, the computer-implemented proxy-selection engine comprising:

an expert rule module comprising a storage that stores a plurality of expert rules including, for each of the plurality of proxy computers, expert rules specifying static conditions and dynamic conditions of the proxy computer, and sets of expert rules applicable to systems and types of the plurality of target devices, each expert rule including a selection-weight factor;

at least one memory storing computer code; and at least one hardware processor, which accesses the at least one memory and executes the computer code to cause the at least one hardware processor to execute modules comprising:

a separator module configured to receive target device information that identifies a target device among the plurality of target devices, and receive device data of the plurality of target devices and categorize each of the plurality of target devices based on at least one of a system to which the target device belongs and a type of the target device; and an intelligence module configured to:

acquire, from the separator module, the categorized at least one of the system and the type for the identified target device;

acquire, from the expert rule module, all expert rules from among the plurality of expert rules that are applicable to the identified target device, based on the at least one of the system and the type of the identified target device;

apply the acquired expert rules to determine one or more candidate proxy computers; and select one or more proxy computers from among the one or more candidate proxy computers based on the selection-weight factors included in the acquired expert rules, wherein, the computer-implemented proxy-selection engine controls an implementation data acquisition (IDA) by instructing the IDA to acquire data from the identified target device through the special control network via the selected one or more proxy computers.

2. The computer-implemented proxy-selection engine according to claim 1, wherein the static conditions comprise specifications and revisions of the plurality of proxy computers, and wherein the dynamic conditions comprise current statuses of the plurality of proxy computers.

3. The computer-implemented proxy-selection engine according to claim 1, wherein the expert rules for the plurality of proxy computers comprise a rule related to a version of the proxy computer, and wherein intelligence module is configured to, in applying the expert rules, not to select a proxy computer if the version of the proxy computer is lower than a version of the target device.

4. The computer-implemented proxy-selection engine according to claim 1, wherein the dynamic conditions comprise one or more of a current status of the proxy computer, and a real-time status of the proxy computer.

5. The computer-implemented proxy-selection engine according to claim 1, wherein the intelligence module is further configured to:
    automatically acquire the expert rules from the expert rule module;
    automatically determine a specification and revision of the proxy computers, based on the static conditions specified in the acquired expert rules;
    automatically determine which proxy computers satisfy the static conditions of the set of expert rules for the at least one of the system and the type of the identified target device, based on the determined specifications and revisions of the proxy computers;
    automatically determine the current status of the proxy computers based on the dynamic conditions specified in the acquired expert rules;
    automatically determine which proxy computers satisfy the dynamic conditions of the set of expert rules for the at least one of the system and the type of the identified target device, based on the determined current status of the proxy computers; and
    automatically determine the one or more candidate proxy computers as proxy computers from among the plurality of proxy computers that satisfy both the static and dynamic conditions.

6. The computer-implemented proxy-selection engine according to claim 1, wherein the intelligence module is further configured to:
    collect system information including system structure information and inter-relations with other systems based on the system of the identified target device;
    collect physical information on the special control network;
    collect features of each of the plurality of proxy computers;
    collect a real-time load on the special control network; and
    select the one or more proxy computers from among the one or more candidate proxy computers based on one or more of the system information, the physical information, the features, and the real-time load; and
    the intelligence module further comprises a set of algorithms indicating user requirements that are applied to select the one or more proxy computers.

7. The computer-implemented proxy-selection engine according to claim 6, wherein the set of algorithms comprises:
    algorithms to calculate a selection-weight factor for each proxy computer; and
    algorithms to select a proxy computer based on the selection-weight factor calculated.

8. A system comprising:
    a plurality of proxy computers communicatively coupled to a plurality of target devices by a special control network;
    an editor configured to input target device information which identifies a target device;
    a proxy-selection engine communicatively coupled to the plurality of proxy computers, the proxy-selection engine comprising:
        an expert rule module comprising a storage that stores a plurality of expert rules including, for each of the plurality of proxy computers, expert rules specifying static conditions and dynamic conditions of the proxy computer, and sets of expert rules applicable to systems and types of the plurality of target devices, each expert rule including a selection-weight factor;
    at least one memory storing computer code; and
    at least one hardware processor, which accesses the at least one memory and executes the computer code to cause the at least one hardware processor to execute modules comprising:
    a separator module configured to receive target device information that identifies a target device among the plurality of target devices, and receive device data of the plurality of target devices and categorize each of the plurality of target devices based on at least one of a system to which the target device belongs and a type of the target device; and
    an intelligence module configured to:
    acquire, from the separator module, the categorized at least one of the system and the type for the identified target device;
    acquire, from the expert rule module, all expert rules from among the plurality of expert rules that are applicable to the identified target device, based on the at least one of the system and the type of the identified target device;
    apply the acquired expert rules to determine one or more candidate proxy computers; and
    select one or more proxy computers from among the one or more candidate proxy computers based on the selection-weight factors included in the acquired expert rules,
    wherein the computer-implemented proxy-selection engine controls an implementation data acquisition (IDA) by instructing the IDA to acquire data from the identified target device through the special control network via the selected one or more proxy computers.

9. The system according to claim 8,
    wherein the static conditions comprise specifications and revisions of the plurality of proxy computers, and
    wherein the dynamic conditions comprise current statuses of the plurality of proxy computers.

10. The system according to claim 8,
    wherein the expert rules for the plurality of proxy computers comprise a rule related to a version of the proxy computer, and
    wherein intelligence module is configured to, in applying the expert rules, not to select a proxy computer if the version of the proxy computer is lower than a version of the target device.

11. The system according to claim 10,
    wherein the dynamic conditions comprise one or more of a current status of the proxy computer, and a real-time status of the proxy computer.

12. The system according to claim 8, wherein the intelligence module is further configured to:
    automatically acquire the expert rules from the expert rule module;
    automatically determine a specification and revision of the proxy computers, based on the static conditions specified in the acquired expert rules;
    automatically determine which proxy computers satisfy the static conditions of the set of expert rules for the at least one of the system and the type of the identified target device, based on the determined specifications and revisions of the proxy computers;
    automatically determine the current status of the proxy computers based on the dynamic conditions specified in the acquired expert rules;

automatically determine which proxy computers satisfy the dynamic conditions of the set of expert rules for the at least one of the system and the type of the identified target device, based on the determined current status of the proxy computers; and automatically determine the one or more candidate proxy computers as proxy computers from among the plurality of proxy computers that satisfy both the static and dynamic conditions.

13. The system according to claim 8, wherein the intelligence module is further configured to:

collect system information including system structure information and inter-relations with other systems based on the system of the identified target device;

collect physical information on the special control network;

collect features of each of the plurality of proxy computers;

collect a real-time load on the special control network; and select the one or more proxy computers from among the one or more candidate proxy computers based on one or more of the system information, the physical information, the features, and the real-time load; and the intelligence module further comprises a set of algorithms indicating user requirements that are applied to select the one or more proxy computers.

14. The system according to claim 8, wherein the set of algorithms comprises:

algorithms to calculate a selection-weight factor for each proxy computer; and algorithms to select a proxy computer based on the selection-weight factor calculated.

15. A computer-implemented proxy-selection system comprising:

a plurality of control stations;

a plurality of proxy computers communicatively coupled to the plurality of control stations through a special control network; and a proxy-selection engine communicatively coupled to the plurality of proxy computers, the proxy-selection engine comprising:

an expert rule module comprising a storage that stores a plurality of expert rules including, for each of the plurality of proxy computers, expert rules specifying static conditions and dynamic conditions of the proxy computer, and sets of expert rules applicable to systems and types of the plurality of control stations, each expert rule including a selection-weight factor;

at least one memory storing computer code; and at least one hardware processor, which accesses the at least one memory and executes the computer code to cause the at least one hardware processor to execute modules comprising:

a separator module configured to receive control stations information that identifies a control stations among the plurality of control stations, and receive device data of the plurality of control stations and categorize each of the plurality of control stations based on at least one of a system to which the control station belongs and a type of the control station; and an intelligence module configured to:

acquire, from the separator module, the categorized at least one of the system and the type for the identified control station;

acquire, from the expert rule module, all expert rules from among the plurality of expert rules that are applicable to the identified control station, based on the at least one of the system and the type of the identified control station;

apply the acquired expert rules to determine one or more candidate proxy computers; and select one or more proxy computers from among the one or more candidate proxy computers based on the selection-weight factors included in the acquired expert rules, wherein the computer-implemented proxy-selection engine controls an implementation data acquisition (IDA) by instructing the IDA to acquire data from the identified control station through the special control network via the selected one or more proxy computers.

16. The computer-implemented proxy-selection system according to claim 15, wherein the expert rules for the plurality of proxy computers comprise a rule related to a version of the proxy computer, and wherein intelligence module is configured to, in applying the expert rules, not to select a proxy computer if the version of the proxy computer is lower than a version of the identified control station.

17. The system according to claim 15, wherein the static conditions comprise specifications and revisions of the plurality of proxy computers, and wherein the dynamic conditions comprise current statuses of the plurality of proxy computers.

18. The system according to claim 15, wherein the dynamic conditions comprise one or more of a current status of the proxy computer, and a real-time status of the proxy computer.

19. The system according to claim 15, wherein the intelligence module is further configured to:

automatically acquire the expert rules from the expert rule module;

automatically determine a specification and revision of the proxy computers, based on the static conditions specified in the acquired expert rules;

automatically determine which proxy computers satisfy the static conditions of the set of expert rules for the at least one of the system and the type of the identified target device, based on the determined specifications and revisions of the proxy computers;

automatically determine the current status of the proxy computers based on the dynamic conditions specified in the acquired expert rules;

automatically determine which proxy computers satisfy the dynamic conditions of the set of expert rules for the at least one of the system and the type of the identified target device, based on the determined current status of the proxy computers; and automatically determine the one or more candidate proxy computers as proxy computers from among the plurality of proxy computers that satisfy both the static and dynamic conditions.

20. The system according to claim 15, wherein the intelligence module is further configured to:

collect system information including system structure information and inter-relations with other systems based on the system of the identified target device;

collect physical information on the special control network;

collect features of each of the plurality of proxy computers;

collect a real-time load on the special control network; and select the one or more proxy computers from among the one or more candidate proxy computers based on one or more of the system information, the physical information, the features, and the real-time load.

* * * * *